(12) United States Patent
Llorente Alonso et al.

(10) Patent No.: US 11,102,972 B2
(45) Date of Patent: Aug. 31, 2021

(54) DEVICE FOR TRAPPING INSECTS

(71) Applicant: ZOBELE HOLDING S.P.A., Trento (IT)

(72) Inventors: Joaquin Llorente Alonso, Barcelona (ES); Rubén García Fábregas, Barcelona (ES)

(73) Assignee: ZOBELE Holding S.P.A.

( * ) Notice: Subject to any disclaimer, the term of this patent is extended or adjusted under 35 U.S.C. 154(b) by 160 days.

(21) Appl. No.: 15/737,866

(22) PCT Filed: Jun. 27, 2016

(86) PCT No.: PCT/EP2016/064822
§ 371 (c)(1),
(2) Date: Dec. 19, 2017

(87) PCT Pub. No.: WO2016/207430
PCT Pub. Date: Dec. 29, 2016

(65) Prior Publication Data
US 2019/0008133 A1 Jan. 10, 2019

(30) Foreign Application Priority Data

Jun. 26, 2015 (ES) ................. ES201530913

(51) Int. Cl.
*A01M 1/14* (2006.01)
*A01M 1/02* (2006.01)

(52) U.S. Cl.
CPC ............. *A01M 1/145* (2013.01); *A01M 1/02* (2013.01); *A01M 1/026* (2013.01); *A01M 2200/012* (2013.01)

(58) Field of Classification Search
CPC .......... A01M 1/145; A01M 1/14; A01M 1/04; A01M 1/02
See application file for complete search history.

(56) References Cited

U.S. PATENT DOCUMENTS

| | | | |
|---|---|---|---|
| 6,397,515 B1 * | 6/2002 | Brown | A01M 1/023 43/113 |
| 2017/0295771 A1 * | 10/2017 | Studer | A01M 1/145 |
| 2017/0295772 A1 * | 10/2017 | Studer | A01M 1/145 |
| 2019/0141978 A1 * | 5/2019 | Smith | A01M 1/02 43/113 |

(Continued)

FOREIGN PATENT DOCUMENTS

| | | | | |
|---|---|---|---|---|
| CA | 2900244 A1 * | 9/2014 | ............. | A01M 1/02 |
| DE | 88 02 934 U1 | 5/1988 | | |

(Continued)

OTHER PUBLICATIONS

International Search Report dated Sep. 21, 2016 in corresponding PCT International Application No. PCT/EP2016/064822.

(Continued)

*Primary Examiner* — Kristen C Hayes
(74) *Attorney, Agent, or Firm* — Ostrolenk Faber LLP

(57) ABSTRACT

A device for trapping insects that includes a casing provided with a housing for placing a refill provided with an adhesive surface for trapping insects. The casing includes a light emitter illuminating at least one portion of the refill. The device allows maximizing the attraction of the insects as a result of the illumination of the refill.

10 Claims, 4 Drawing Sheets

(56) References Cited

U.S. PATENT DOCUMENTS

| | | | | |
|---|---|---|---|---|
| 2019/0141979 A1* | 5/2019 | Smith | ............ | A01M 1/145 |
| | | | | 43/114 |
| 2019/0208760 A1* | 7/2019 | Towne | ............ | A01M 1/04 |
| 2019/0261616 A1* | 8/2019 | Studer | ............ | A01M 1/145 |

FOREIGN PATENT DOCUMENTS

| | | | | |
|---|---|---|---|---|
| DE | 102 36 531 A1 | 2/2004 | | |
| EP | 3269236 A1 * | 1/2018 | ............ | A01M 1/02 |
| JP | 2002-209496 A | 7/2002 | | |
| WO | WO 2005/053389 A1 | 6/2005 | | |
| WO | WO 2007/045879 A1 | 4/2007 | | |
| WO | WO 2014/134371 A1 | 9/2014 | | |
| WO | WO 2015/081033 A1 | 6/2015 | | |
| WO | WO-2016115107 A1 * | 7/2016 | ............ | F21V 3/00 |
| WO | WO-2018013081 A1 * | 1/2018 | ............ | A01M 1/02 |
| WO | WO-2018075119 A2 * | 4/2018 | ............ | A01N 25/10 |

OTHER PUBLICATIONS

Written Opinion dated Sep. 21, 2016 in corresponding PCT International Application No. PCT/EP2616/064822.
Search Report dated Sep. 30, 2016 in corresponding Spanish Patent Application No. 201530913.

* cited by examiner

DEVICE FOR TRAPPING INSECTS

CROSS-REFERENCE TO RELATED APPLICATIONS

The present application is a 35 U.S.C. §§ 371 national phase conversion of PCT/EP2016/064822, filed Jun. 27, 2016, which claims priority to Spanish Patent Application No. P201530913, filed Jun. 26, 2015, the contents of which are incorporated herein by reference. The PCT International Application was published in the English language.

The present invention relates to a device for trapping insects, which allows easily placing and removing a refill and allows attracting the insects more effectively.

BACKGROUND OF THE INVENTION

It is known that the presence of insects in some environments can be irritating, for example, the presence of flies or mosquitoes in a private home or restaurant terrace. The use of insecticides or devices for trapping insects to avoid the presence of flying insects is known.

These devices for trapping insects comprise an adhesive surface impregnated with some kind of fragrance causing the insects to be attracted to it, and to be trapped upon approaching same as they are stuck on said adhesive surface.

In some cases these devices for trapping insects can include a light emitter emitting light of any color aimed at attracting the insects, but said light emitter emits an occasional light which does not attract insects effectively.

Another drawback of the devices known today is that they do not comprise a refill that can be comfortably placed and removed, such that this refill always has maximum efficiency.

Therefore, the objective of the present invention is to provide a device for trapping insects comprising a refill which can be easily placed and removed, and which also attracts insects with maximum efficiency.

DESCRIPTION OF THE INVENTION

The device for trapping insects of the invention successfully solves the mentioned drawbacks, having other advantages that will be described below.

The device for trapping insects according to the present invention comprises a casing provided with a housing for placing a refill provided with an adhesive surface for trapping insects, and is characterized in that said casing comprises a light emitter illuminating at least one portion of the refill.

Advantageously, said refill comprises a transparent or translucent frame which is illuminated by said light emitter.

Furthermore, said refill can also comprise a transparent or translucent grid which is illuminated by said light emitter.

Therefore, the refill increases the attraction of the insects as a result of the illumination.

Advantageously, said frame comprises a gripping edge on two opposite sides, making placement and removal of the refill even easier.

Furthermore, said casing advantageously comprises a detector for detecting the presence of the adhesive element inside the housing, said detector being connected to said light emitter, such that said light emitter is turned on when the presence of said adhesive element inside the housing is detected.

Preferably, said refill comprises at least one protective sheet which is removed before first use to prevent the adhesive surface from losing part of its characteristics before the first use.

Furthermore, said casing preferably comprises a protective grid arranged between the adhesive element and the outside of the casing for preventing a user from inadvertently touching the adhesive surface.

Advantageously, said light emitter emits ultraviolet light, and preferably said ultraviolet light is in the range between 350 and 450 mm, more preferably between 390 and 400 mm.

BRIEF DESCRIPTION OF THE DRAWINGS

To better understand what has been set forth above, several drawings schematically depicting only by way of non-limiting example a practical embodiment are attached.

DESCRIPTION OF A PREFERRED EMBODIMENT

Figure 1:
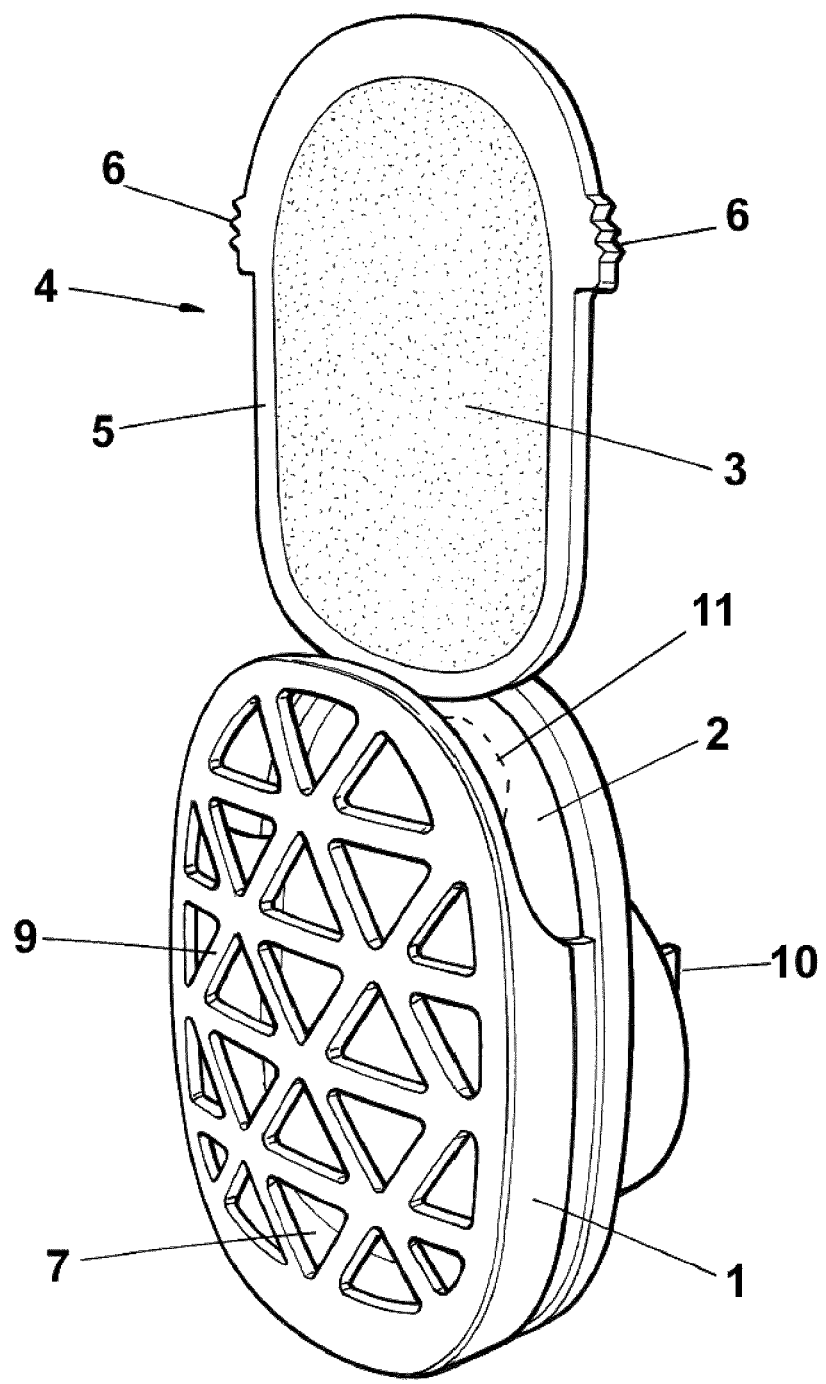
FIG. 1 is a perspective view of the device for trapping insects according to the present invention with the refill removed from the casing.

The device for trapping insects according to the present invention comprises a casing 1 provided with a housing 2 for placing a refill 4 provided with an adhesive surface 3.

Said adhesive surface 3 can be impregnated with pheromones and/or with fragrances suitable for attracting insects, for example, flies.

Said casing 1 also advantageously comprises an electric socket 10 for its connection to an electrical outlet.

Said refill 4 is provided with an outer frame 5 surrounding the adhesive surface 3, which comprises a gripping edge 6 on two opposite sides for making placement and removal of the refill 4 on/from its housing 2 easier.

This frame 5 is preferably transparent or translucent, such that it can be illuminated by means of a light emitter 11 which can be arranged in the rear portion of the housing 2, such that the frame 5 serves as a guide, the light propagating through the frame 5.

Said light emitter 11 preferably emits ultraviolet light, for example in the range between 350 mm and 450 mm, more preferably between 390 mm and 400 mm.

This light emitter 11 will be turned on and off automatically when the refill 4 is placed inside the housing 2, and to that end the housing 2 comprises a detector 7 detecting the presence of the refill 4. This detector 7 is preferably placed in the lower portion of the housing 2, such that the refill 4 will not be detected if it is wrongly inserted in the housing 2.

Figure 2:
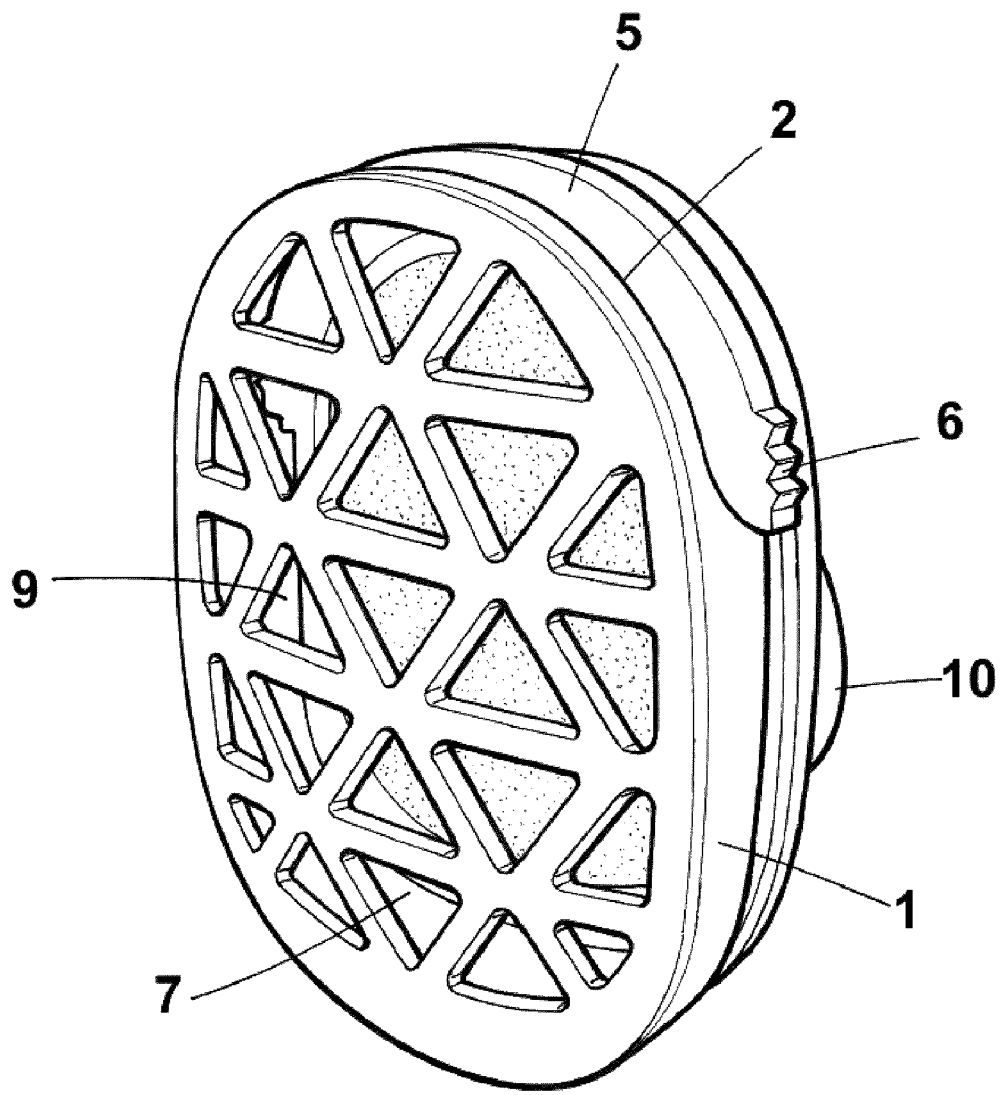
FIG. 2 is a perspective view of the device for trapping insects according to the present invention with the refill housed in the casing.

This light emitter 11 can be powered by a battery or by the electric network, if the device comprises the electric socket 10, as in the case of the embodiment depicted in FIGS. 1 and 2.

The attraction of the insects is maximized when illuminating the entire transparent or translucent frame 5 as a result of the presence of the light emitter 11.

To prevent accidental contact with the adhesive surface 3 when the refill 4 is in its position of use inside the housing 2, the casing 1 comprises a protective grid 9.

Figure 3:
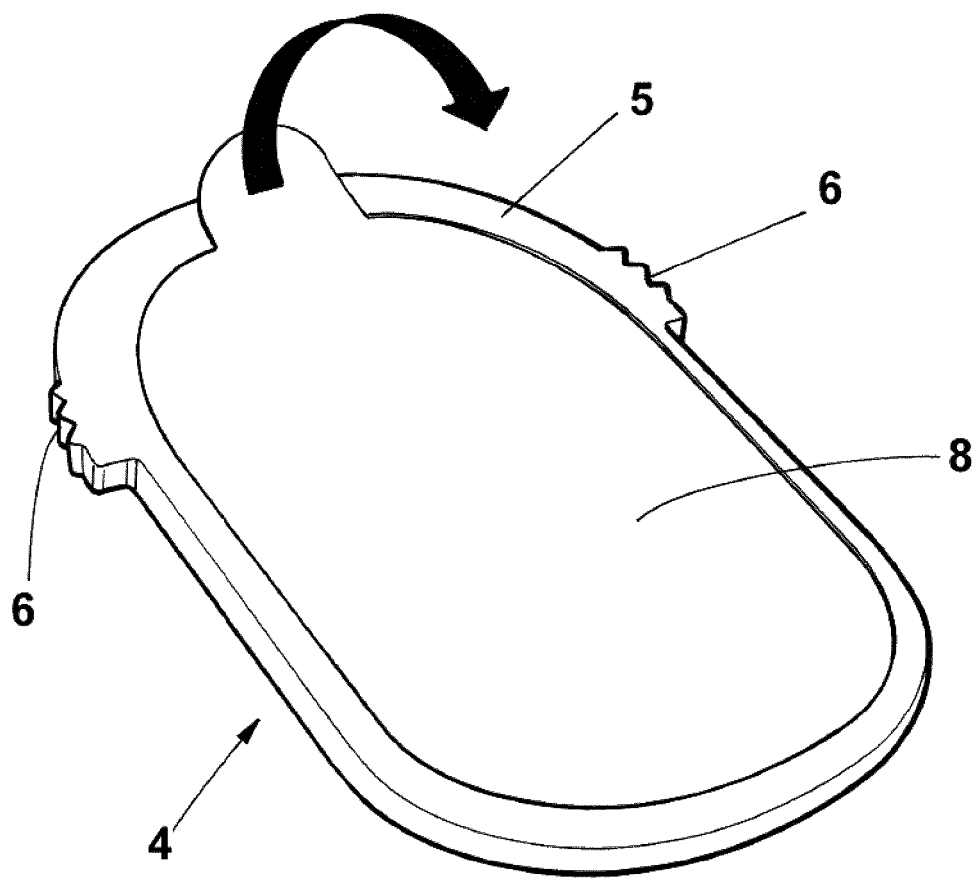
FIG. 3 is a perspective view of the refill before its first use with a protective sheet.

To use the refill 4, firstly a protective sheet 8 needs to be removed, which is depicted in FIG. 3. This protective sheet 8 is placed on the adhesive surface 3 to prevent it from losing part of its characteristics before the first use of the refill 4.

Once the protective sheet 8 is removed, the refill 4 can be inserted in its housing 2 of the casing 1, comfortably holding the refill by its gripping edges 6, inserting the refill through the upper opening, as observed in FIG. 1.

When the refill 4 has a sufficient quantity of insects adhered to the adhesive surface 3 or when it no longer sufficiently attracts the insects, the refill 4 is removed, also holding it by its gripping edges 6, the upper opening of the housing 2 being wide enough to allow removal of the refill 4 with the insects adhered to the adhesive surface 3.

Figure 4:
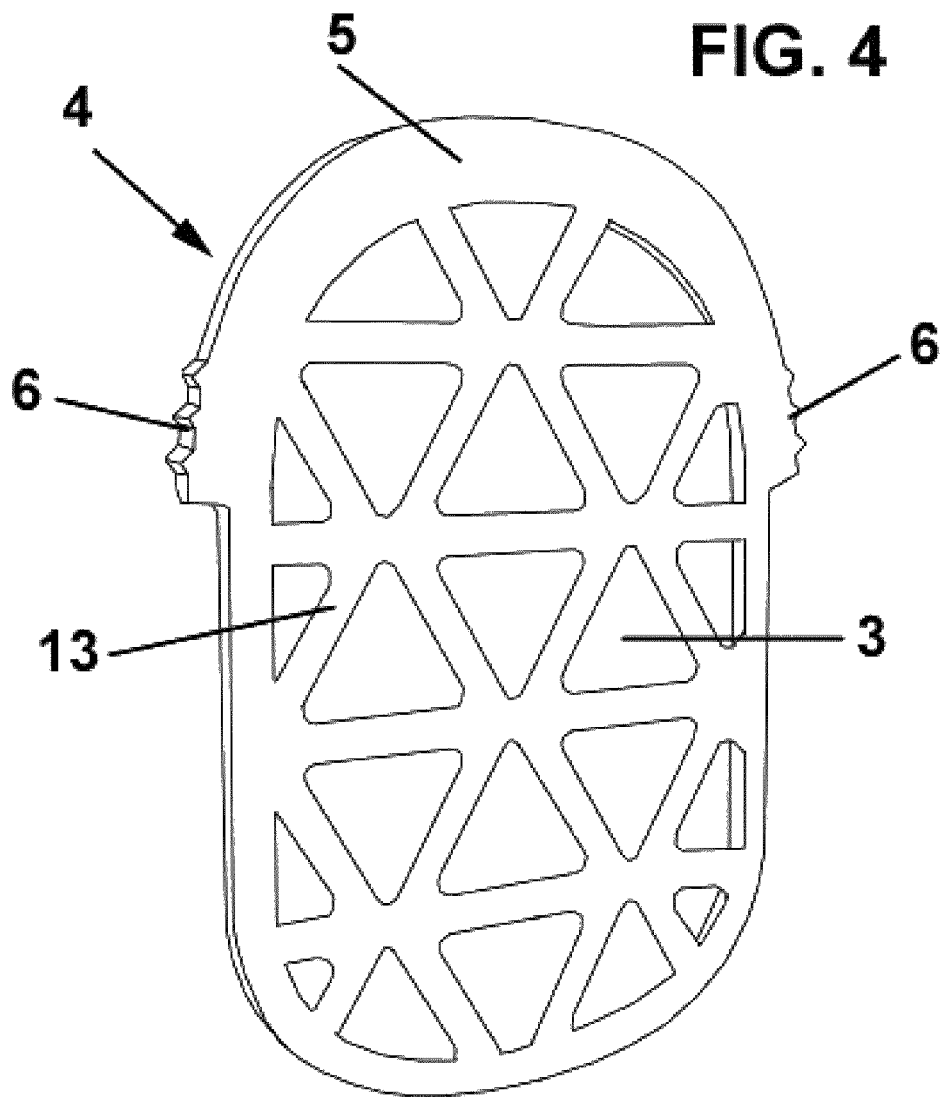
FIG. 4 is a perspective view of the rear face of an embodiment of the refill where the transparent plastic part of the frame extends discontinuously behind the central portion of the adhesive sheet, forming a grid.

A refill 4 according to a second embodiment is depicted in FIG. 4. For simplicity's sake, the same elements of the refill are indicated with the same reference numbers. As observed in the drawing, the refill has the same outer dimensions similar to the previous refill, but it further comprises a grid 13 extending discontinuously behind the central area of the refill, such that it creates areas with high illumination and areas with low illumination, which cause visible contrasts on the front face of the refill in use. For this preferred embodiment, the adhesive sheet 3 is of a transparent or translucent material.

It has been proven that this contrast between the illuminated and non-illuminated areas attracts the insects even more.

Although reference has been made to a specific embodiment of the invention, it is obvious for a person skilled in the art that the device for trapping insects described is susceptible to a number of variations and modifications, and that all the mentioned details can be replaced with other technically equivalent details, without departing from the scope of protection defined by the attached claims.

The invention claimed is:

1. An insect trap device comprising:
    a casing comprising a housing configured to house a refill;
    the refill configured to be removably slid into the casing and consisting of:
        an adhesive surface configured to trap an insect,
        a frame positioned around the adhesive surface and that is at least one of transparent and translucent, and
        at least one protective sheet configured to be removed before first use; and
    said casing comprising a light emitter illuminating at least one part of the refill, including the frame,
    wherein said casing comprises a protective grid arranged between the refill and the outside of the casing.

2. The device for trapping insects according to claim 1, wherein said frame comprises a gripping edge on two opposite sides.

3. The device for trapping insects according to claim 1, wherein said casing comprises:
    a detector for detecting the presence of the refill inside the housing;
    wherein said detector is connected to said light emitter such that said light emitter is turned on when the presence of said refill inside the housing is detected.

4. The device for trapping insects according to claim 1, wherein said light emitter emits ultraviolet light.

5. The device for trapping insects according to claim 4, wherein said ultraviolet light is in the range between 350 and 450 mm.

6. The device for trapping insects according to claim 5, wherein said ultraviolet light is in the range between 390 and 400 mm.

7. An insect trap device comprising:
    a casing comprising a housing configured to house a refill;
    the refill configured to be removably slid into the casing and consisting of:
        an adhesive surface configured to trap an insect,
        a frame positioned around the adhesive surface and that is at least one of transparent and translucent, and
        at least one protective sheet configured to be removed before first use; and
        a transparent or translucent grid positioned so as to be illuminated by a light emitter; and
    said casing comprising a light emitter illuminating at least one part of the refill, including the frame,
    wherein said casing comprises a protective grid arranged between the refill and the outside of the casing.

8. The device for trapping insects according to claim 7, wherein the grid is positioned on a first major side of the refill, and
    wherein said protective grid is arranged between the refill and the outside of the casing facing a second major side of the refill opposite the first side.

9. The device for trapping insects according to claim 8, wherein the protective grid of the casing extends discontinuously behind a central area of the refill, such that the protective grid in use creates areas with high illumination and areas with low illumination detectable on the first side of the refill.

10. An insect trap device comprising:
    a casing comprising a housing configured to house a refill;
    the refill configured to be removably slid into the casing and consisting of:
        an adhesive surface configured to trap an insect,
        a frame positioned around the adhesive surface and that is at least one of transparent and translucent; and
    said casing comprising a light emitter illuminating at least a part of the refill, including the frame,
    wherein said casing comprises a protective grid arranged between the refill and the outside of the casing.

\* \* \* \* \*